United States Patent
Song et al.

(10) Patent No.: US 10,122,143 B2
(45) Date of Patent: Nov. 6, 2018

(54) PULSED LASER SYSTEM

(71) Applicant: ELECTRONICS AND TELECOMMUNICATIONS RESEARCH INSTITUTE, Daejeon (KR)

(72) Inventors: Dong Hoon Song, Daejeon (KR); Moon Youn Jung, Daejeon (KR)

(73) Assignee: ELECTRONICS & TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 15/680,087

(22) Filed: Aug. 17, 2017

(65) Prior Publication Data

US 2018/0083407 A1 Mar. 22, 2018

(30) Foreign Application Priority Data

Sep. 21, 2016 (KR) .................. 10-2016-0121005
Feb. 3, 2017 (KR) .................. 10-2017-0015823

(51) Int. Cl.
*H01S 3/00* (2006.01)
*G02F 1/355* (2006.01)
*H01S 3/23* (2006.01)
*H01S 3/16* (2006.01)

(52) U.S. Cl.
CPC .......... *H01S 3/0057* (2013.01); *G02F 1/3551* (2013.01); *H01S 3/1636* (2013.01); *H01S 3/2308* (2013.01)

(58) Field of Classification Search
CPC .... H01S 3/0057; H01S 3/1636; H01S 3/2308; G02F 1/3551
USPC ........................................... 359/337
See application file for complete search history.

(56) References Cited

U.S. PATENT DOCUMENTS

| 4,612,641 A * | 9/1986 | Corkum ............... H01S 3/0057 372/25 |
| 4,758,795 A * | 7/1988 | Ripin ..................... H01P 9/00 330/4 |
| 4,972,156 A * | 11/1990 | Gregor .................. H01S 3/0057 359/338 |
| 6,804,045 B2 * | 10/2004 | Barty ..................... H01S 3/0057 359/337 |
| 9,337,608 B2 | 5/2016 | Simon-Boisson |
| 2015/0214688 A1 | 7/2015 | Song et al. |
| 2016/0149368 A1 | 5/2016 | Song et al. |

FOREIGN PATENT DOCUMENTS

KR 10-2010-0122822 A 11/2010

* cited by examiner

*Primary Examiner* — Mark Hellner (57) ABSTRACT

Disclosed is a pulsed laser system. The pulsed laser system comprises a laser oscillator, a first optical amplifier on a rear end of the laser oscillator, a first optical adjustor on a rear end of the first optical amplifier, and a second optical adjustor on a rear end of the first optical adjustor. The first optical adjustor comprises a saturable absorber, an adjusting compressor on a rear end of the saturable absorber, and a first plasma mirror on a rear end of the adjusting compressor.

14 Claims, 6 Drawing Sheets

PULSED LASER SYSTEM

CROSS-REFERENCE TO RELATED APPLICATIONS

This U.S. nonprovisional patent application claims priority under 35 U.S.C. § 119 of Korean Patent Application Nos. 10-2016-0121005 filed on Sep. 21, 2016 and 10-2017-0015823 filed on Feb. 3, 2017 entire contents of which are hereby incorporated by reference.

BACKGROUND

The present inventive concept relates to a pulsed laser system.

Since a laser was invented in 1960s, researches have started extensively on industrial applications of the laser from 1970s. Since 1980, the laser, especially $CO_2$ laser, has been utilized to various fields such as industry, medical care, communication, display, and the like.

Also, a solid state laser appeared in 1980s due to development of a diode laser. Because the solid state laser can be applicable to fields to which a conventional gaseous laser cannot be applied, demand for the laser has been increased. Thus, laser application fields are becoming extremely broad, for example, an industry field such as laser working, laser cutting, laser welding, laser punching, laser trimming, laser etching, a medical field such as dental treatment, spot removal, tattoo removal, hair removal, LASIK operation, an academic field studying on interaction between laser and material, a national defense field, and a cultural field.

Development of industrial technology requires high precision and productivity in the field where the laser is used. In order to meet the requirements, an ultrashort laser beam has recently been utilized in various fields. The ultrashort laser beam is generally called a femtosecond or picosecond laser beam.

The ultrashort laser beam has characteristics that an optical energy is focused for a very short time (e.g., about $10^{-12}$ to $10^{-15}$ seconds) to emit light. Thus, the ultrashort laser beam exhibits different characteristics from those of a conventional laser beam. For example, when a medium is provided with the ultrashort laser beam, the ultrashort laser beam is irradiated for a shorter time than for a time for which heat is transferred to the medium such that it may be possible to avoid thermal effect or thermal deformation occurred in a conventional laser process. Since the ultrashort laser beam can process a medium without damages to a surface of the medium, it has been used in fields wherein precise and fine treatments are required (e.g. semiconductor, electronic chips, medical care, etc.).

SUMMARY

Embodiments of the present inventive concept provide a pulsed laser system having enhanced a contrast ratio and intensity.

An object of the present inventive concept is not limited to the above-mentioned one, other objects which have not been mentioned above will be clearly understood to those skilled in the art from the following description.

According to exemplary embodiments of the present inventive concept, a pulsed laser system may comprise: a laser oscillator, a first optical amplifier on a rear end of the laser oscillator, a first optical adjustor on a rear end of the first optical amplifier, and a second optical adjustor on a rear end of the first optical adjustor. The first optical adjustor may comprise: a saturable absorber; an adjusting compressor on a rear end of the saturable absorber; and a first plasma mirror on a rear end of the adjusting compressor.

In some embodiments, the pulsed layer system may further comprise a non-linear cross-polarization filter between the first optical amplifier and the saturable absorber.

In some embodiments, the adjusting compressor may be a second adjusting compressor. The first optical adjustor may further comprise a first adjusting compressor between the first optical amplifier and the non-linear cross-polarization filter.

In some embodiments, each of the non-linear cross-polarization filter, the saturable absorber, and the first plasma mirror may enhance a contrast ratio of a laser at its different intervals from each other.

In some embodiments, the non-linear cross-polarization filter may comprise: a lens; a polarizer on a rear end of the lens; a non-linear crystal on a rear end of the polarizer; and an analyzer on a rear end of the non-linear crystal.

In some embodiments, the first plasma mirror may comprise: first and second mirrors; and a driving part that moves the first and second mirrors.

In some embodiments, the pulsed layer system may further comprise a second optical adjustor on a rear end of the second optical amplifier. The second optical adjustor may comprise a second plasma mirror.

In some embodiments, the first optical amplifier may be an amplifier based on a principle of chirped pulse amplification (CPA). The second optical amplifier may be an amplifier based on a principle of optical parametric chirped pulse amplification (OPCPA).

According to exemplary embodiments of the present inventive concept, a pulsed laser system may comprise: a laser oscillator; first and second optical amplifiers that amplify a laser generated from the laser oscillator; and a first optical adjustor between the first and second optical amplifiers and enhancing a contrast ratio of the laser. The first optical adjustor may comprise: a non-linear cross-polarization filter that enhances a contrast ratio of the laser at its first interval; and a first plasma mirror that enhances a contrast ratio of the laser at its second interval.

In some embodiments, the second interval may be wider than the first interval.

In some embodiments, the pulsed laser system may further comprise a saturable absorber between the non-linear cross-polarization filter and the first plasma mirror. The saturable absorber may enhance a contrast ratio of the laser at its third interval narrower than the first and second intervals.

In some embodiments, the first interval may comprise the third interval, and the second interval may comprise the first interval.

In some embodiments, the first optical adjustor may comprise: a first adjusting compressor on a front end of the non-linear cross-polarization filter; and a second adjusting mirror between the saturable absorber and the first plasma mirror.

In some embodiments, the pulsed laser system may further comprise a second optical adjustor on a rear end of the second optical amplifier. The second optical adjustor may comprise a second plasma mirror.

Details of other exemplary embodiments are included in the description and drawings.

DETAILED DESCRIPTION OF EMBODIMENTS

The advantages and features of the present invention, and methods of achieving them will be apparent from the following exemplary embodiments that will be described below in detail with reference to the accompanying drawings showing the exemplary embodiments. It should be noted, however, that the present invention is not limited to the following exemplary embodiments, and may be implemented in various forms. Rather, the exemplary embodiments are provided only to disclose the present invention and let those skilled in the art fully know the scope of the present invention. The present invention is defined only by the scope of the claims and equivalents thereof. Like reference numerals refer to like elements throughout the specification.

The terminology used herein is for the purpose of describing particular embodiments only and is not intended to limit the present invention. As used herein, the singular forms are intended to include the plural forms as well unless specially stated. It will be understood that the terms "comprises", and/or "comprising" specify the presence of stated elements, steps, operations, and/or devices, but do not preclude the presence or addition of one or more other elements, steps, operations, and/or devices.

In addition, the embodiments in the detailed description will be discussed with reference to sectional and/or plan views as ideal exemplary views of the present invention. In the drawings, thicknesses of layers and regions are exaggerated for effectively explaining the technical contents. Accordingly, variations from the shapes of the illustrations as a result of manufacturing techniques and/or tolerances are to be expected. Thus, exemplary embodiments should not be construed as limited to the shapes of regions illustrated herein but are to include deviations in shapes that result from manufacturing process. Accordingly, regions exemplarily illustrated in the drawings are schematic in nature, and their shapes are intended to exemplarily disclose actual shapes of a region of a device and are not intended to limit the scope of the scope of the present invention.

Figure 1:
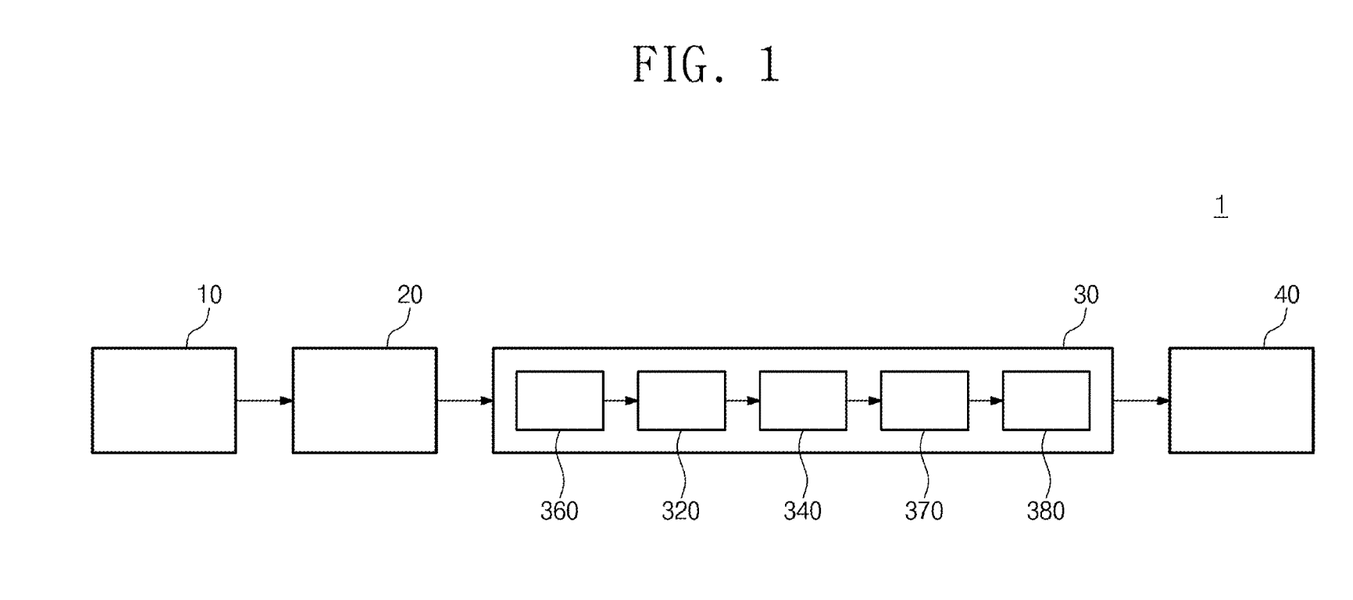
FIG. 1 shows a pulsed laser system according to exemplary embodiments of the present inventive concept.

FIG. 1 shows a pulsed laser system 1 according to exemplary embodiments of the present inventive concept. The pulsed laser system 1 may include a laser oscillator 10, a first optical amplifier 20, a first optical adjustor 30, and a second optical amplifier 40. The laser oscillator 10, the first optical amplifier 20, the first optical adjustor 30, and the second optical amplifier 40 may be sequentially arranged along a traveling direction of a laser. Arrows shown in FIG. 1 may denote the traveling direction of the laser.

The laser oscillator 10 may generate the laser. The laser oscillator 10 may use a titanium sapphire crystal as a gain material. The laser generated from the laser oscillator 10 may have pulses in the range of several to several tens of femtoseconds.

The first optical amplifier 20 may be disposed on a rear end of the laser oscillator 10. In this description, when one component is disposed before/after other component along the traveling direction of the laser, it can be expressed that one component is disposed on a front/rear end of the other component. The first optical amplifier 20 may amplify the laser generated from the laser oscillator 10. Although not shown, a preamplifier may be provided between the laser oscillator 10 and the first optical amplifier 20, which may support laser amplification in the first optical amplifier 20. For example, the laser generated from the laser oscillator 10 may be amplified and reduced in its repetition rate, and thus the first optical amplifier 20 may have an enhanced effect on the laser amplification.

The first optical amplifier 20 may be an amplifier based on the principle of chirped pulse amplification (CPA). For example, the first optical amplifier 20 may include, in cascade, a stretcher, an amplifier, and a compressor. The first optical amplifier 20 may operate such that the stretcher expands a time width of a pulse, the amplifier amplifies the pulse, and the compressor amplifies again the time pulse of the pulse. Alternatively, the first optical amplifier 20 may be an amplifier based on the principle of optical parametric chirped pulse amplification (OPCPA).

The first optical adjustor 30 may be disposed on a rear end of the first optical amplifier 20. The first optical adjustor 30 may include a first adjusting compressor 360, a non-linear cross-polarization filter 320, a saturable absorber 340, a second adjusting compressor 370, and a first plasma mirror 380.

The first adjusting compressor 360 may be disposed on a front end of the non-linear cross-polarization filter 320. The first adjusting compressor 360 may adjust a pulse width of the laser to support that an optical non-linear phenomenon occurs in the non-linear cross-polarization filter 320. Although not shown, the first adjusting compressor 360 may be composed of a prism, a diffraction grating, a chirped mirror, etc.

Figure 2:
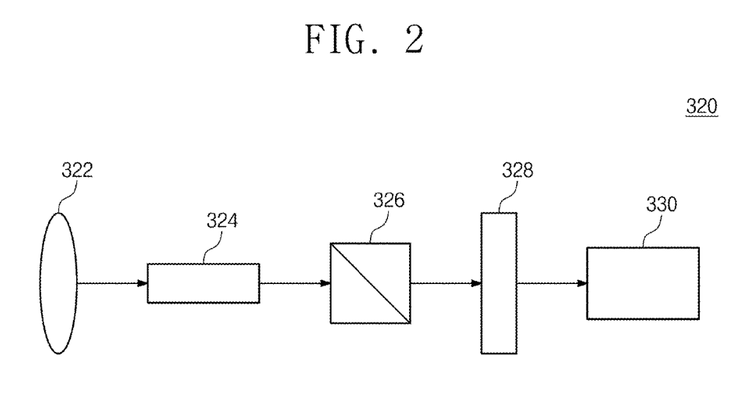
FIG. 2 shows a detailed configuration of a non-linear cross-polarization filter of FIG. 1.

FIG. 2 shows a detailed configuration of the non-linear cross-polarization filter 320 of FIG. 1. Referring to FIG. 2, the non-linear cross-polarization filter 320 may include a lens 322, an optical fiber 324, a polarizer 326, a non-linear crystal 328, and an analyzer 330. The lens 322, the optical fiber 324, the polarizer 326, the non-linear crystal 328, and the analyzer 330 may be sequentially disposed along the traveling direction of the laser. The lens 322 may focus the laser. The optical fiber 324 may transmit the laser to the polarizer 326, and may enhance quality of the transmitted laser. The polarizer 326 may adjust an input polarization of the laser. The non-linear crystal 328 may include, for example, $BaF_2$. The analyzer 330 may analyze the laser into the input polarization and a newly generated polarization.

An optical non-linear phenomenon of the laser may occur in the non-linear cross-polarization filter 320. For example, the optical non-linear phenomenon may be a four wave mixing process. Through this, the laser may be changed in its phase such that it may be possible to expand a spectrum and simultaneously to enhance a laser contrast ratio. The non-linear cross-polarization filter 320 may enhance a contrast ratio of the laser at its first interval (see P1 of FIG. 4). For example, the non-linear cross-polarization filter 320 may cause an enhancement of several hundred to several thousand times in the laser contrast ratio. In this description, the term of "laser contrast ratio" may be defined to refer to a ratio between laser intensity and background noise (e.g., amplification of spontaneous emission) at a central position of a main pulse.

Referring back to FIG. 1, the saturable absorber 340 may be disposed on a rear end of the non-linear cross-polarization filter 320. The saturable absorber 340 may enhance the laser contrast ratio. The saturable absorber 340 may cause an enhancement of a contrast ratio of the laser at its third interval (see P3 of FIG. 4). For example, the saturable absorber 340 may cause an enhancement of several hundred times in the laser contrast ratio.

The second adjusting compressor 370 may be disposed on a front end of the first plasma mirror 380. The second adjusting compressor 370 may adjust a pulse width of the laser to control a focusing intensity of the laser incident onto the first plasma mirror 380. Although not shown, the second adjusting compressor 370 may be composed of a prism, a diffraction grating, a chirped mirror, etc.

Figure 3A:
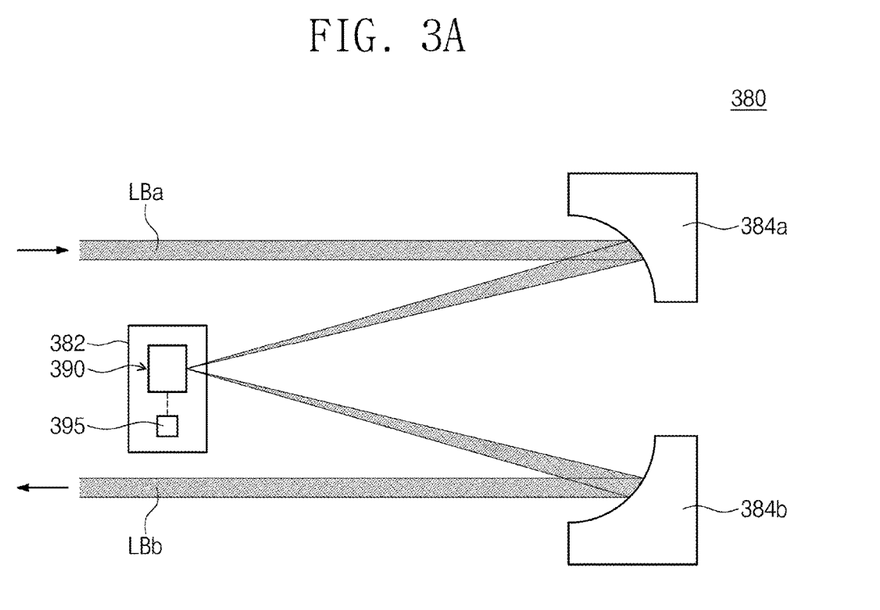
FIG. 3A shows a first plasma mirror of FIG. 1.
Figure 3B:
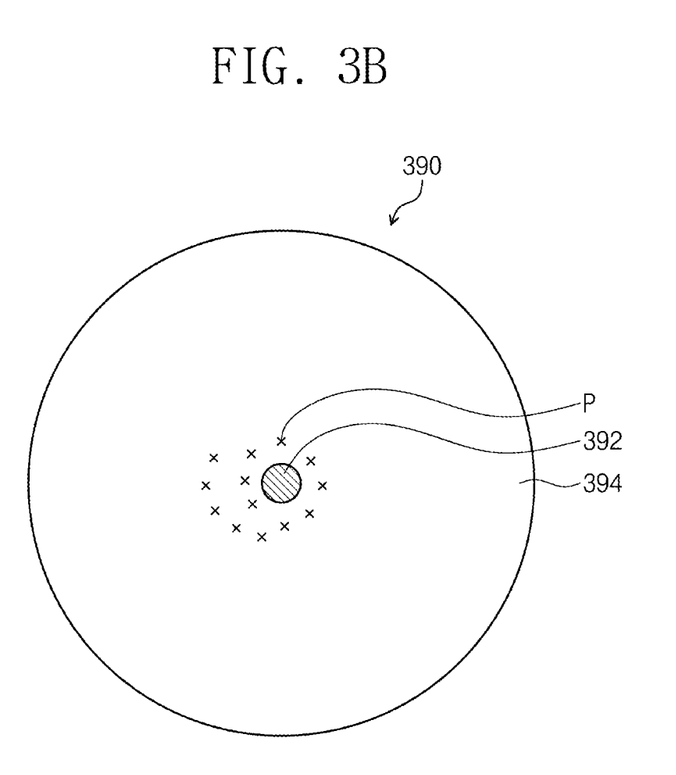
FIG. 3B shows a plasma mirror of FIG. 3A.

FIG. 3A shows the first plasma mirror 380 of FIG. 1. FIG. 3B shows a plasma mirror 390 of FIG. 3A. FIGS. 3A and 3B are hereinafter referenced to explain the first plasma mirror 380. The first plasma mirror 380 may include a vacuum pump 382, aspherical reflecting mirrors 384a and 384b, a plasma mirror 390, and a driving part 395. A laser LBa emitted from the second adjusting compressor 370 may strike the aspherical reflecting mirror 384a and may then be reflected toward the plasma mirror 390, and the laser LBa reflected from the plasma mirror 390, i.e., a laser beam LBb, may go back to the aspherical reflecting mirror 384b and may then travel toward the second optical amplifier 40.

The plasma mirror 390 and the driving part 395 may be disposed in the vacuum chamber 382. The plasma mirror 390 may include a first mirror 392 and a second mirror 394. Referring to FIG. 3B, the first and second mirrors 392 and 394 may be portions of the plasma mirror 390. For example, the first mirror 392 may be a coating portion for high-reflection, and the second mirror 394 may be other coating portion for anti-reflection.

The first mirror 392 may exhibit reflectance of about 100% such that no plasma may be generated even when the laser is incident thereto. Accordingly, the first mirror 392 may be used to align optical components of a laser system. In contrast, plasma may be generated by the laser incident onto the second mirror 394. The plasma may occur on the second mirror 394 only a single time such that, when a specific area of the second mirror 394 receives the laser to generate the plasma, the specific area may suffer from damages due to irradiation of the laser and may therefore not be used to regenerate the plasma. Hence, the driving part 395 may move a laser irradiation potion P whenever the laser is provided onto the second mirror 394.

The driving part 395 may move the first and second mirrors 392 and 394. For example, the driving part 395 may operate in such a way that the irradiation point P of the laser incident onto the plasma mirror 390 is changed between the first and second mirrors 392 and 394. In addition, the driving part 395 may change the laser irradiation point P of the second mirror 394 according to an irradiation time of the laser incident onto the plasma mirror 390.

The first plasma mirror 380 may enhance the laser contrast ratio. The first plasma mirror 380 may cause an enhancement of a contrast ratio of the laser at its second interval (see P2 of FIG. 4). In other words, the contrast ratio may be better with the laser LBb after incidence onto the plasma mirror 390 than with the laser LBa before incidence onto the plasma mirror 390. For example, the first plasma mirror 380 may cause an enhancement of several thousand times in the laser contrast ratio. Although not shown, the first plasma mirror 380 may have a beam splitter on its entrance and a CCD on its exit, and thus the laser may be prevented from its position variation.

Referring back again to FIG. 1, the second optical amplifier 40 may be disposed on a rear end of the first optical adjustor 30. The second optical amplifier 40 may be an amplifier based on the principle of chirped pulse amplification (CPA). For example, the second optical amplifier 40 may include, in cascade, a stretcher, an amplifier, and a compressor. The second optical amplifier 40 may operate such that the stretcher expands a time width of a pulse, the amplifier amplifies the pulse, and the compressor amplifies again the time pulse of the pulse. Alternatively, the second optical amplifier 40 may be an amplifier based on the principle of optical parametric chirped pulse amplification (OPCPA).

Figure 4:
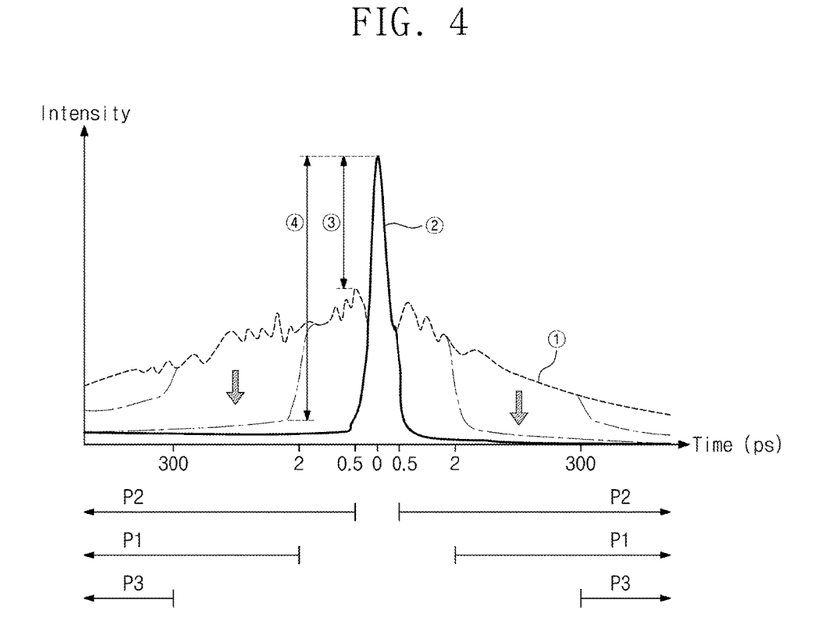
FIG. 4 shows an enhancement of laser contrast ratio and laser intensity when using a pulsed laser system according to exemplary embodiments of the present inventive concept.

FIG. 4 shows an enhancement of laser contrast ratio and laser intensity when using the pulsed laser system 1 according to exemplary embodiments of the present inventive concept. In FIG. 4, a symbol ① may denote a laser intensity according to a comparative example (e.g., a pulsed laser system only including a laser oscillator, a first optical amplifier, and a second optical amplifier), and a symbol ② may represent a laser intensity according to the pulsed laser system of the present inventive concept. In FIG. 4, a symbol ③ may express a laser contrast ratio according to the comparative example, and a symbol ④ may signify a laser contrast ratio according to the pulsed laser system of the present inventive concept.

As discussed above, the first optical amplifier 30 may include the non-linear cross-polarization filter 320, the saturable absorber 340, and the first plasma mirror 380, each of which enhances the contrast ratio of the laser at its different intervals from each other. The non-linear cross-polarization filter 320 may enhance the laser contrast ratio at the first interval P1, the first plasma mirror 380 may enhance the laser contrast ratio at the second interval P2, and the saturable absorber 340 may enhance the laser contrast ratio at the third interval P3.

As shown in FIG. 4, the first interval P1 may be wider than the third interval P3, and the second interval P2 may be wider than the first interval P1. The first interval P1 may include the third interval P3, and the second interval P2 may include the first interval P1. For example, the first interval P1 may be a time interval after about 2 ps, and the second interval P2 may be a time interval after about 0.5 ps, and the third interval P3 may be a time interval after about 300 ps. In other words, the first plasma mirror 380 may enhance the laser contrast ratio at a time interval from about 0.5 ps to about 2 ps. The laser contrast ratio may be overlapping-enhanced by the first plasma mirror 380 and the non-linear cross-polarization filter 320 at a time interval from about 2 ps to about 300 ps. The laser contrast ratio may be overlapping-enhanced by the first plasma mirror 380, the non-linear cross-polarization filter 320, and the saturable absorber 340 at a time interval after about 300 ps. In conclusion, embodiments of the present inventive concept may have the laser contrast ratio ④ superior to the laser contrast ratio ③ according to the comparative example.

According to the present inventive concept, the pulsed laser system 1 may be provided to have enhanced contrast ratio. As a result, the pulsed laser system 1 may also have improved laser intensity. For example, when using the pulsed laser system 1 according to embodiments of the present inventive concept, an input/output laser beam may have energy increased to about several mJ to about several to several tens of J. In addition, since the first optical adjustor 30 is disposed between the first and second optical amplifiers 20 and 40, i.e., at the front of the pulsed laser system 1, the pulsed laser system 1 may be reduced in its overall size.

Figure 5:
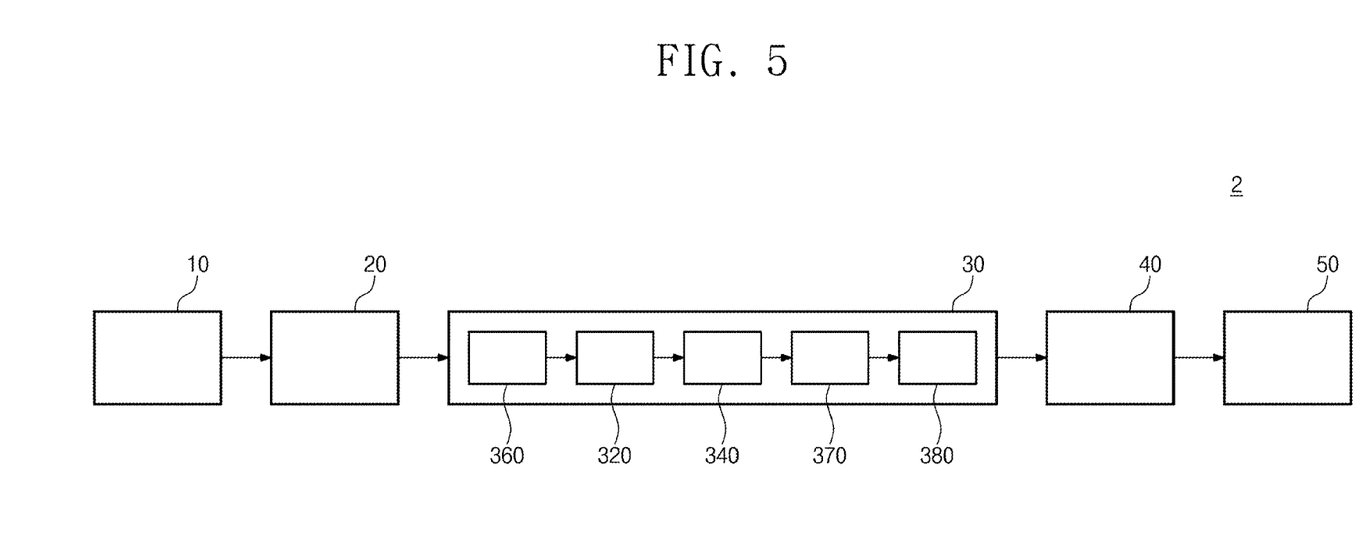
FIG. 5 shows a pulsed laser system according to exemplary embodiments of the present inventive concept.

FIG. 5 shows a pulsed laser system 2 according to exemplary embodiments of the present inventive concept. In the embodiment that follows, components substantially the same as those of the pulsed laser system 1 discussed with reference to FIGS. 1 to 4 are allocated the same reference numerals thereto, and a repetitive explanation may be omitted in the interest of brevity of the description.

The pulsed laser system 2 may further include a second optical adjustor 50. The second optical adjustor 50 may be disposed on a rear end of the second optical amplifier 40. The second optical adjustor 50 may be a second plasma mirror. Since the second optical adjustor 50 is additionally disposed, the laser contrast ratio may be more enhanced.

In this description, the first optical adjustor 30 is exemplarily illustrated that the non-linear cross-polarization filter 320, the saturable absorber 340, and the plasma mirror 380 are sequentially disposed. Alternatively, the non-linear cross-polarization filter 320, the saturable absorber 340, and the plasma mirror 380 may be arranged in different sequences. However, it may be recommended that an adjusting compressor be disposed on a front end of each of the non-linear cross-polarization filter 320 and the plasma mirror 380.

Although the present invention has been described in connection with the embodiments of the present invention illustrated in the accompanying drawings, it will be understood to those skilled in the art that various changes and modifications may be made without departing from the technical spirit and essential feature of the present invention. It will be apparent to those skilled in the art that various substitution, modifications, and changes may be thereto without departing from the scope and spirit of the inventive concept.

What is claimed is:

1. A pulsed laser system, comprising:
a laser oscillator;
a first optical amplifier on a rear end of the laser oscillator;
a first optical adjustor on a rear end of the first optical amplifier; and
a second optical adjustor on a rear end of the first optical adjustor,
wherein the first optical adjustor comprises:
a saturable absorber;
an adjusting compressor on a rear end of the saturable absorber; and
a first plasma mirror on a rear end of the adjusting compressor.

2. The pulsed laser system of claim 1, further comprising a non-linear cross-polarization filter between the first optical amplifier and the saturable absorber.

3. The pulsed laser system of claim 2, wherein the adjusting compressor is a second adjusting compressor, and wherein the first optical adjustor further comprises a first adjusting compressor between the first optical amplifier and the non-linear cross-polarization filter.

4. The pulsed laser system of claim 2, wherein each of the non-linear cross-polarization filter, the saturable absorber, and the first plasma mirror enhances a contrast ratio of a laser at its different intervals from each other.

5. The pulsed laser system of claim 2, wherein the non-linear cross-polarization filter comprises:
a lens;
a polarizer on a rear end of the lens;
a non-linear crystal on a rear end of the polarizer; and
an analyzer on a rear end of the non-linear crystal.

6. The pulsed laser system of claim 1, wherein the first plasma mirror comprises:
first and second mirrors; and
a driving part that moves the first and second mirrors.

7. The pulsed laser system of claim 1, further comprising a second optical adjustor on a rear end of the second optical amplifier,
wherein the second optical adjustor comprises a second plasma mirror.

8. The pulsed laser system of claim 1, wherein the first optical amplifier is an amplifier based on a principle of chirped pulse amplification (CPA), and the second optical amplifier is an amplifier based on a principle of optical parametric chirped pulse amplification (OPCPA).

9. A pulsed laser system, comprising:
a laser oscillator;
first and second optical amplifiers that amplify a laser generated from the laser oscillator; and
a first optical adjustor being disposed between the first and second optical amplifiers and enhancing a contrast ratio of the laser,
wherein the first optical adjustor comprises:
a non-linear cross-polarization filter that enhances a contrast ratio of the laser at its first interval; and
a first plasma mirror that enhances a contrast ratio of the laser at its second interval.

10. The pulsed laser system of claim 9, wherein the second interval is wider than the first interval.

11. The pulsed laser system of claim 9, further comprising a saturable absorber between the non-linear cross-polarization filter and the first plasma mirror,
wherein the saturable absorber enhances a contrast ratio of the laser at its third interval which is narrower than the first and second intervals.

12. The pulsed laser system of claim 10, wherein the first interval comprises the third interval, and the second interval comprises the first interval.

13. The pulsed laser system of claim 9, wherein the first optical adjustor comprises:
a first adjusting compressor on a front end of the non-linear cross-polarization filter; and
a second adjusting mirror between the saturable absorber and the first plasma mirror.

14. The pulsed laser system of claim 9, further comprising a second optical adjustor on a rear end of the second optical amplifier,
wherein the second optical adjustor comprises a second plasma mirror.

* * * * *